No. 676,545. Patented June 18, 1901.
C. MILLS.
FLASH LIGHT APPARATUS.
(Application filed Aug. 6, 1900.)
(No Model.) 2 Sheets—Sheet 1.
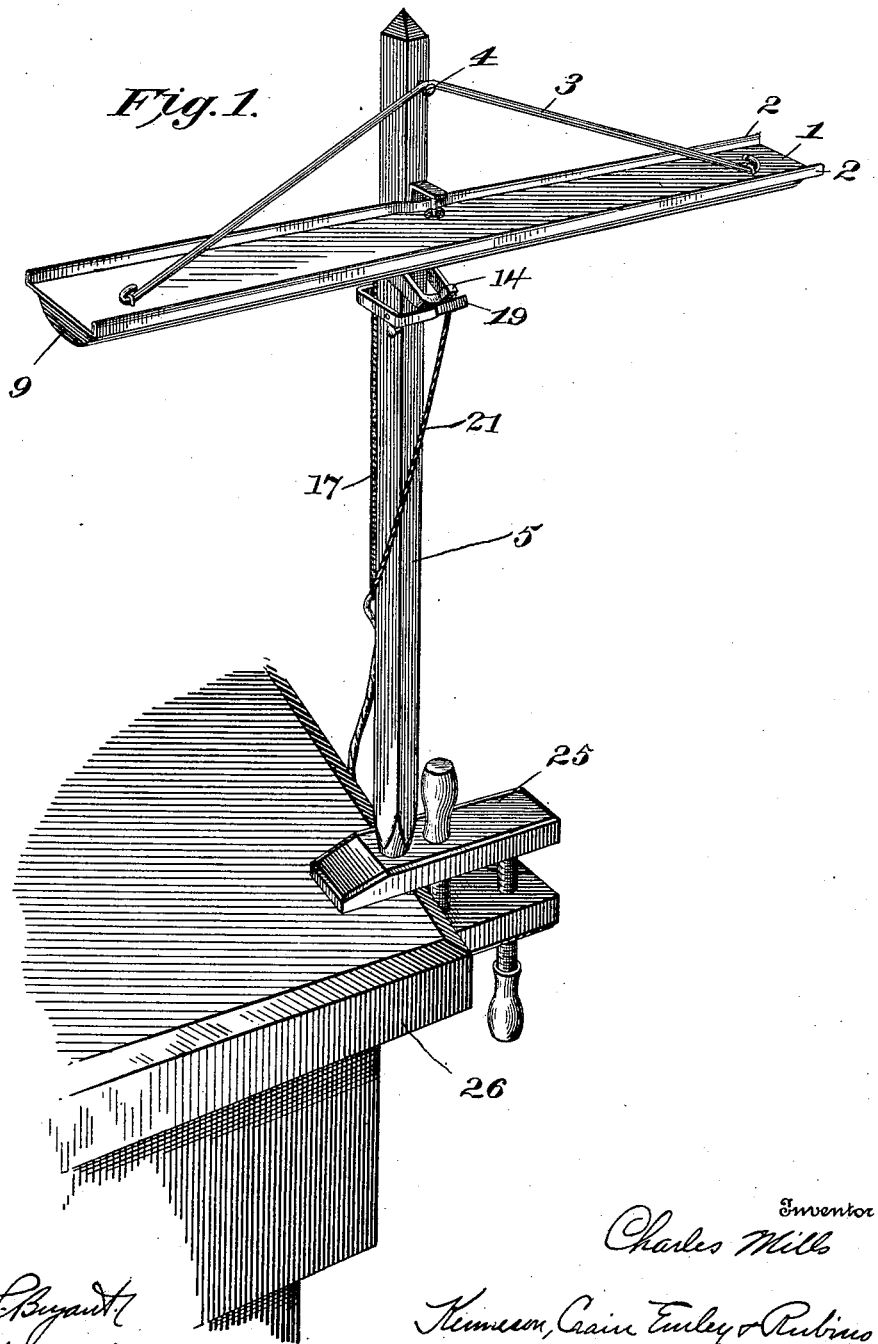

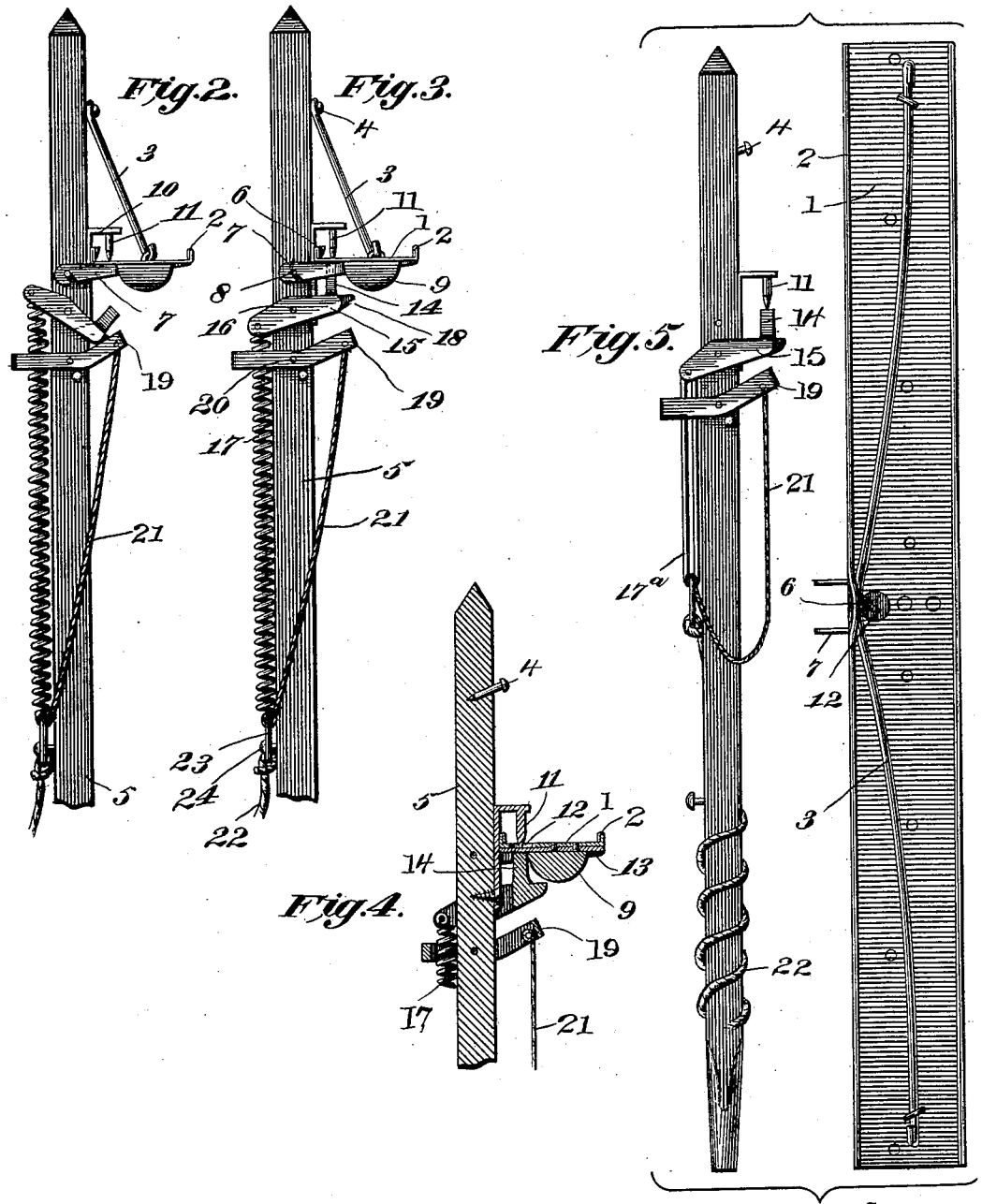

UNITED STATES PATENT OFFICE.

CHARLES MILLS, OF NEW YORK, N. Y.

FLASH-LIGHT APPARATUS.

SPECIFICATION forming part of Letters Patent No. 676,545, dated June 18, 1901.

Application filed August 6, 1900. Serial No. 26,064. (No model.)

*To all whom it may concern:*

Be it known that I, CHARLES MILLS, a subject of the Queen of Great Britain, residing at New York, in the county of New York, State of New York, have invented certain new and useful Improvements in Flash-Light Apparatus, of which the following is a specification.

The present invention consists in a cheap, simple, and reliable apparatus for producing flash-lights for photographic purposes, such as photographing interiors and making pictures at night.

The invention will be fully described in connection with the accompanying drawings, in which—

Figure 1 is a perspective view of the apparatus mounted upon a table or other suitable support. Fig. 2 shows the hammer cocked ready for use. Fig. 3 shows the trigger after it has been "pulled" and the hammer thrown against the percussion-cap. Fig. 4 is a central section through the operative parts, and Fig. 5 shows the apparatus taken apart and in condition for transportation.

Referring to the drawings, 1 indicates a pan which is preferably long and narrow and provided with flanges 2 to retain the flash-light powder or material. This material is spread along the pan in proper quantity and proportion for the purpose in view. The forward edge of the pan is supported by a wire bail 3, which, as shown in Fig. 1, engages a pin or shoulder 4 upon a supporting-post 5. When the apparatus is "knocked down" or ready for shipment, the bail 3 can be placed wholly within the pan, as shown in Fig. 5. To hold it in place, its middle portion is passed under an inturned lip 6 at the back of the pan.

The pan is supported at the rear by two arms 7, which hook over pins 8 upon the post 5. The pan is preferably strengthened and stiffened by attaching to its bottom a strip 9 of wood or other suitable material. Above the pan, on a suitable bracket 10, is a stationary anvil or firing-pin 11. In the bottom of the pan 1, below the pin 11, is a receptacle 12, in which may be placed a percussion-cap. As shown, this receptacle is formed by a circular opening in the bottom of the pan and a plate 13 beneath the pan, said plate being integral with the arms 7. The pan is sufficiently flexible so that it may be depressed slightly in the middle to permit of a cap being placed in the receptacle 12 below the pin 11.

Below the firing-pin is a hammer 14, carried by a pivoted lever 15, said lever 15 being in the form of a yoke the branches of which are pivoted at 16 on opposite sides of the post 5. To the rear end of the lever 15 is connected a suitable spring. As shown in Figs. 2 and 3, this is a spiral spring 17, while in Fig. 5 it is shown as a rubber band 17ª. On the forward end of the hammer-lever 15 is a detent 18, which is adapted to engage a trigger 19. The trigger is shown in the form of a hollow rectangle pivoted at 20 beneath the hammer 15. A small cord 21 is provided to draw down the forward end of the trigger and release the hammer. A cord 22, attached to the spring 17, is preferably provided for convenience in drawing the spring down. When the spring is distended, a loop 23 on its lower end is engaged with a pin 24 on the post 5.

The operation is as follows: The apparatus is fixed in position in any suitable manner. For instance, the post 5 may be mounted on a clamp 25, which is securely attached to a table or other support 26, as shown in Fig. 1. The pan is mounted on the post, as shown in Figs. 1 to 3, inclusive. The flash-light powder is placed in an elongated heap upon the pan, and a cap is placed in the receptacle 12 under the firing-pin 11, care being taken to have some of the powder in the vicinity of the cap. The trigger is then engaged with the hammer and the hammer put under tension, as shown in Fig. 2. By reference to the drawings, it will be seen that the lower end of the cord 21 is connected to the eye or loop 23. Said cord 21 is of such length that it will be taut when the loop 23 is engaged with the stud or pin 24. Therefore when the parts are positioned as above described a slight additional pull on the cord 22 releases the loop 23 from the stud or pin 24 and exerts sufficient pull on the cord 21 to release the hammer and permit it to fly up under the influence of the spring. The blow drives the firing-pin into the cap and explodes the latter, instantaneously igniting the flash-light powder.

Having described my invention, what I claim, and desire to secure by Letters Patent, is—

1. In a flash-light apparatus, the combination of a suitable support, a pan, an anvil or firing-pin arranged on one side of the pan, and a hammer arranged on the opposite side of the pan and adapted to coöperate with the pin to explode a percussion-cap.

2. In a flash-light apparatus, the combination with a suitable support, of a pan, a firing-pin, a hammer arranged to coöperate with said pin to explode a cap arranged between the pin and hammer, a spring for throwing the hammer, and a trigger arranged to hold the hammer temporarily away from the firing-pin.

3. In a flash-light apparatus, the combination with a supporting-post, of a pan, a firing-pin above the pan, a hammer pivotally mounted below the pan, a spring arranged, when under tension, to throw the hammer toward the firing-pin, and a trigger operating to hold the hammer temporarily away from the firing-pin.

4. In a flash-light apparatus, the combination with a powder-receptacle, of a firing-pin extending into said receptacle, a hammer arranged to coöperate with the firing-pin to explode a cap placed between said pin and a wall of the powder-receptacle, a spring for throwing the hammer toward the pin, and a trigger for holding the hammer away from the pin.

5. In a flash-light apparatus, the combination with a powder-support, a fixed firing-pin above the powder-support, a hammer arranged to strike the under side of the powder-support opposite the firing-pin to explode a cap mounted on said support in line with the pin, a spring for throwing the hammer toward the pin, and a trigger for holding the hammer away from the pin.

6. In a flash-light apparatus, the combination with a supporting-post, of an elongated pan, a pair of hooked arms connected with the pan and adapted to engage projections upon the post, and a bail connecting the outer ends of the pan with a projection or shoulder upon the post.

7. In a flash-light apparatus, the combination with a supporting-post, an elongated pan arranged transversely of the post and connected thereto, a fixed firing-pin above the pan, means for holding a cap upon the pan opposite the firing-pin, a hammer having arms or members pivotally connected to opposite sides of the post, a detent or projection on said hammer, a trigger arranged below the hammer and pivotally connected to opposite sides of the post, said trigger being adapted to engage with the projection on the hammer, and a spring for throwing the hammer when released by the trigger.

In testimony whereof I affix my signature in the presence of two witnesses.

CHARLES MILLS.

Witnesses:
E. A. LOUX,
JAS. DAVIDSON.